United States Patent [19]

Lee

[11] Patent Number: 5,398,170
[45] Date of Patent: Mar. 14, 1995

[54] OPTICAL-FIBER DISPLAY WITH INTENSIVE BRIGHTNESS

[76] Inventor: Song S. Lee, 3240 Greentree Way, San Jose, Calif. 95117

[21] Appl. No.: 885,115

[22] Filed: May 18, 1992

[51] Int. Cl.$^6$ .............................................. G09F 13/06
[52] U.S. Cl. ....................... 362/32; 362/84; 362/224; 362/260; 362/268; 362/293; 40/579; 40/581; 40/572
[58] Field of Search .................. 362/32, 84, 223, 224, 362/225, 260, 268, 293, 310, 331; 40/564, 579, 581, 572

[56] References Cited

U.S. PATENT DOCUMENTS

| | | | |
|---|---|---|---|
| 585,451 | 6/1897 | Schneider | 362/32 |
| 1,816,459 | 7/1931 | Adelmann | 40/579 |
| 2,051,288 | 8/1936 | Curtis, Jr. | 40/133 |
| 2,148,172 | 2/1939 | Pearl | 40/579 |
| 2,212,454 | 8/1940 | Porter | 40/579 |
| 3,530,615 | 9/1970 | Meyer | 40/133 |
| 3,767,910 | 10/1973 | Harrigan | 362/32 |
| 4,151,582 | 4/1979 | Grunberger | 362/31 |
| 4,196,539 | 4/1980 | Speers | 46/16 |
| 4,276,705 | 7/1981 | Barth et al. | 40/133 |
| 4,814,948 | 3/1989 | Hasegawa | 362/32 |
| 4,843,524 | 6/1989 | Krent et al. | 362/32 |
| 4,860,475 | 8/1989 | Levy et al. | 40/547 |
| 4,961,617 | 10/1990 | Shahidi et al. | 362/32 |

FOREIGN PATENT DOCUMENTS 169885  6/1934  Switzerland ............... 40/579

Primary Examiner—Ira S. Lazarus
Assistant Examiner—L. Heyman
Attorney, Agent, or Firm—Samson G. Yu

[57] ABSTRACT

An optical display apparatus includes a plurality of optical elements of acrylic material and an additive. Each optical element is shaped into cylindrical body with a first convex end and a second convex end to improve light receiving and transmitting efficiency of the optical element. By activation of a fluorescent lamp, the optical elements can emit ultra-bright color light. A light reflective chamber encloses the fluorescent lamp and the optical elements. Through a panel of the chamber and the optical elements mounted on the panel via apertures of the panel, various desired display patterns may be accomplished. The additive may be fluorescent color dyes or bleaching power. The optical display apparatus further includes a convex lens, a color disc and a motor. The motor drives the color disc to rotate so that light rays focus by the convex lens have variable colors. By means of optical-coupling means, the variable-color light rays are reflectively transmitted to some of optical elements to generate abundant color lights.

16 Claims, 7 Drawing Sheets

OPTICAL-FIBER DISPLAY WITH INTENSIVE BRIGHTNESS

BACKGROUND OF THE INVENTION

The present invention relates to optical displays and, in particular, to an optical display. A major objective of the present invention is to provide an optical display that emits bright visible-light.

Much modern technology is closely identified with the manufacturing and the applications of optical fibers. The main application of optical fibers is the transmission of light, which is based on the principle of total reflection of light rays. When a light ray traveling in an optical medium of refractive-index $n_1$, strikes an interface with an optical medium of refractive-index $n_2$, then the total reflection will occur if $n_1$ is larger than $n_2$ and an incident angle (measured to the normal of the interface) is larger than a 15 critical angle of total reflection. In this fashion, the light rays are repeatedly reflected within the optical medium of refractive-index $n_1$ in the direction of transmission without loss of light energy.

An application of optical fibers is information display in which bare optical fibers are used. As optical fibers have a refractive index larger than that of air surrounding the optical fibers, the light into the bare optical fibers is transmitted forward in the bare optical fiber, and is refracted into air at an end of the optical fiber. In order to provide bright light, the end of the optical fiber is designed as convex in shape according to optical principle.

The use of such optical fibers allows light from a lighting source to be transmitted to remote and spaced locations where the light may be emitted as either a point or line of illumination. Because of the unique capability of optical fibers to transmit light, it is possible to create displays of light without having to provide a lamp or other light source at the point of display. Optical fibers have been utilized to create a variety of visual and ornamental displays which may take a sculptured or three dimensional form or may appear as points or lines of light along a viewing surface or panel.

U.S. Pat. No. 4,276,705 to Barth et al., "Barth" herein, involves graphic display means, and relates to an enclosure with a thin opaque cover made up of an outermost sheet of paper bearing a design, to serve as a display face. An underlying sheet of aluminum foil is backed by an aluminum screen. Incandescent lights are mounted within the enclosure to light its interior. Through the use of pointed markers made of transparent plastic, pinpoints of light can be spotted where desired on the display face for various purposes. The markers are exposed to light in the interior of the enclosure as they pierce the aluminum foil, and therefore show up as points of light on the display face.

Barth discloses a marker constructed from a light transmitting material, such as glass or one of the transparent or translucent plastics. Each mark has a substantially cylindrical shank, a tapered piercing tip and a spherical head. The aluminum screen retains the markers in position when they are pushed through the foil and to provide reinforcing support for the thin, flexible foil.

U.S. Pat. No. 4,860,475 to Levy et al., "Levy" herein, discloses an educational kit for teaching and developing the creative arts wherein each kit includes a frame in which one or more changeable panels, pictures or screens are selectively mounted and wherein the frame provides support for one or more bundles of optical fibers which may be illuminated by a light source also mounted within the frame. The kits further include color filters which are preferably in the form of color wheels adjustablly mounted with respect to the fiber optic bundles and the light source.

U.S. Pat. No. 2,051,288 to Thomas J. Curtis, "Curtis" herein, addresses an illuminated sign element that is formed of transparent material. In Curtis' preferred embodiment, the element has a substantially cylindrical body, a shoulder and a convex head. The external surface of both forward portion of the body and the head are etched or frosted.

Although the prior art acknowledges variety of optical-fiber displays using optical fibers, the applications of these optical-fiber displays are considerably limited because the optical fibers cannot provide enough light intensity compared to that of neon sign. The light intensity of the optical fibers may be improved by the use of light source with high power and/or the optical fibers with enlarged cross-section.

However, the cost of the optical-fiber display use of high power light source and/or optical fibers with enlarged cross-section is raised. The high power is also dangerous for operation and maintenance. In addition, because prior art optical fibers applied in optical display does not emit light actually, only change of the physical shape of optical fibers does not bring about any improvement of their light-emitting property of per unit area. Furthermore, the optical fibers with large cross-section bring into lower resolution of information display. Therefore, prior art optical-fiber display is not available to replace the neon sign.

Neon sign is commonly accepted in commercial display due to its brightness. However, a relatively high voltage, usually 3,000 v to 12,000 v, has to be applied to neon sign apparatus so as to activate the gas filled in the glass tubes of the neon sign apparatus. This high voltage generates very strong interference. With use of the gas filled glass tubes in the neon sign apparatus, the maintenance of neon sign becomes cumbersome. In addition, when a part of a neon sign is broken, the continuous tube of broken part has to be replaced, which significantly raises the cost of maintenance. The expensive cost of neon sign is also an obstacle to its application.

What is needed is an optical display with bright visible-light. In particular, an enclosed-light-reflective chamber and an intensive lighting source within the reflective chamber provide intensive light rays. Optical elements of predetermined shape and additive materials are provided to effectively collect the intensive light rays in the chamber. During light rays are transmitted through the body of each optical fiber, the additive materials in the optical elements is activated to emit or to scatter light so that the light intensity emitted from the optical elements is increased, thereby generating ultra-bright light.

SUMMARY OF THE INVENTION

In accordance with the present invention, an optical display apparatus includes enclosing means that defines a light-reflective chamber. A lighting source is mounted within the chamber. The light rays from the lighting source are continuously reflected within the chamber so as to generate intensive light rays. A plurality of light-emitting optical elements are mounted through apertures on a panel of the enclosing means. The intensive light rays in the chamber are applied to these light-emitting optical elements, activating the light-emitting optical elements to emit intensive bright light.

The enclosing means differs from a conventional frame in which the present invention utilizes a material with both light-reflective and heat-conductive properties performance, for example aluminum, to form the enclosing means. Therefore, the enclosing means defines a chamber that repeatedly reflects light rays from the lighting source into the optical elements; so the intensity of light rays within it is significantly enhanced.

Unlike conventional optical fibers that are only able to transmit light from a lighting source, the present invention provides a light-emitting optical elements with a mixture of acrylic material and an additive including transparent color fluorescent dyes and/or bleaching powder. The fluorescent dyes possess the property of converting a light of a short wavelength into a light of a long wavelength; and the bleaching powder is then used to scatter light so that the light on the cross-section of the optical fiber looks uniform and bright. Therefore, the optical elements in accordance with the present invention functions as intensive light-enhancement.

The acrylic material is of optical-grade property; and the mixture has at least $5 \times 10^{-5}$ parts by weight additive per part by weight acrylic material. Preferably, a transparent-color-fluorescent-dye additive is uniformly blended with the acrylic material to provide the mixture of $5 \times 10^{-5}$ to $8 \times 10^{-4}$ parts by weight additive per part by weight acrylic material. This mixture may emit color light under the activation of light rays. The color light is much more intensive than the light rays activating the mixture, based on the property of fluorescent dyes.

When optical-grade acrylic material is uniformly blended with $5 \times 10^{-5}$ to $8 \times 10^{-4}$ parts by weight bleaching power, the resultant mixture then scatters white light. Since bleaching powder in the optical elements can cause an effect of visible intensive light, the optical fiber made up of acrylic material and bleaching powder bring about more intensive visible effect than that of the light rays from the lighting source.

To improve the light-emitting property, the optical elements made up of the mixtures are designed to have a substantially convex tail, a convex head and a substantially cylindrical body. The body extends from the convex tail to the convex head. Each optical element is mounted on a panel of the enclosing means. The panel has a plurality of apertures to receive the optical elements. The optical element is so mounted that its body and convex tail are exposed to the intensive light rays within the chamber.

The convex tail of the optical fiber possesses light-collecting property. In addition, the light rays within the chamber are directly applied by the lighting source and indirectly reflected by the reflective walls of the chamber to the body and the tail end of each optical element. The light rays collected by both body and convex tail are reflectively transmitted through the body to the convex head. During the transmission, the light rays activate the additive to emit or scatter light, which further increases the intensity of the light rays transmitted in the body. Therefore, when the light rays finally arrive at the convex head of the optical element, the light intensity is significantly enhanced due to the effect of the additive and the intensive light rays reflected by the chamber.

Moreover, a coating of relatively high refractive-index is applied to the surface of the convex head, which increases the intensity of the emitting light. In addition, the light-emitting angle of the convex head may be defined by a conical portion extending from the body to the convex head, the light-emitting angle focuses the intensive light at the head so that the light emitted from the convex head is defined within a predetermined range, thereby further enhancing the light intensity.

The coating materials to improve the light-emitting effect may be selected from those materials of relatively high refractive-index. Available coating materials include epoxy, lacquer and glue.

To improve the light intensity, the lighting source is selected from those capable of emitting intensive light. Preferably, the present invention uses fluorescent lamps as the lighting source, to utilize the fluorescence effect of the dye additive within the optical elements. The fluorescent lamps and the optical elements lead to ultrabright light as compared to the light of a conventional optical display apparatus.

A light-collecting assembly is further provided within the light-reflective chamber for collecting light rays. A colored disc is located above the light-collecting assembly. The colored disc is driven by an electrical motor. The collected light rays are further focused in the light-collecting assembly, then pass rotating colored disc. As the colored disc is rotated, the color of light rays varies. The variable colored light is coupled to some optical elements made up of acrylic material and bleaching powder by an optical coupling device, for example conventional optical fibers. Accordingly, the optical display of the present invention presents abundant colors and intensive bright-light.

An embodiment of the present invention comprises a clear-transparent-plastic plate above the panel so as to form a panel assembly. The convex heads of the optical elements are sandwiched therein. The panel assembly firmly holds the optical elements in place. Also, the panel assembly isolates the optical elements from the environment, protecting the optical elements from contamination. In order to effectively increase the area of information display, the present invention provides two panel assemblies at the opposite sides of the enclosing means.

Because the present invention employs the optical elements as light-emitting elements, the electrical power to drive the lighting source is relatively low. Therefore, the use and operation of the optical display apparatus are safe and easy.

Furthermore, the lifetime of optical elements may be as long as 30 years, so the optical display apparatus is durable, which largely reduces the cost.

In addition, the brightness and colors of the optical display are adjustable by regulating the lighting source, using the optical elements with different fluorescent color dyes and changing the colors of the color disc.

Combining the advantages of both conventional optical-fiber displays and neon signs, the optical display apparatus of the present invention is available to the applications of both fields. These and other features and advantages of the present invention are apparent from the description below with reference to the following drawings.

DESCRIPTION OF THE PREFERRED EMBODIMENTS

Figure 1:
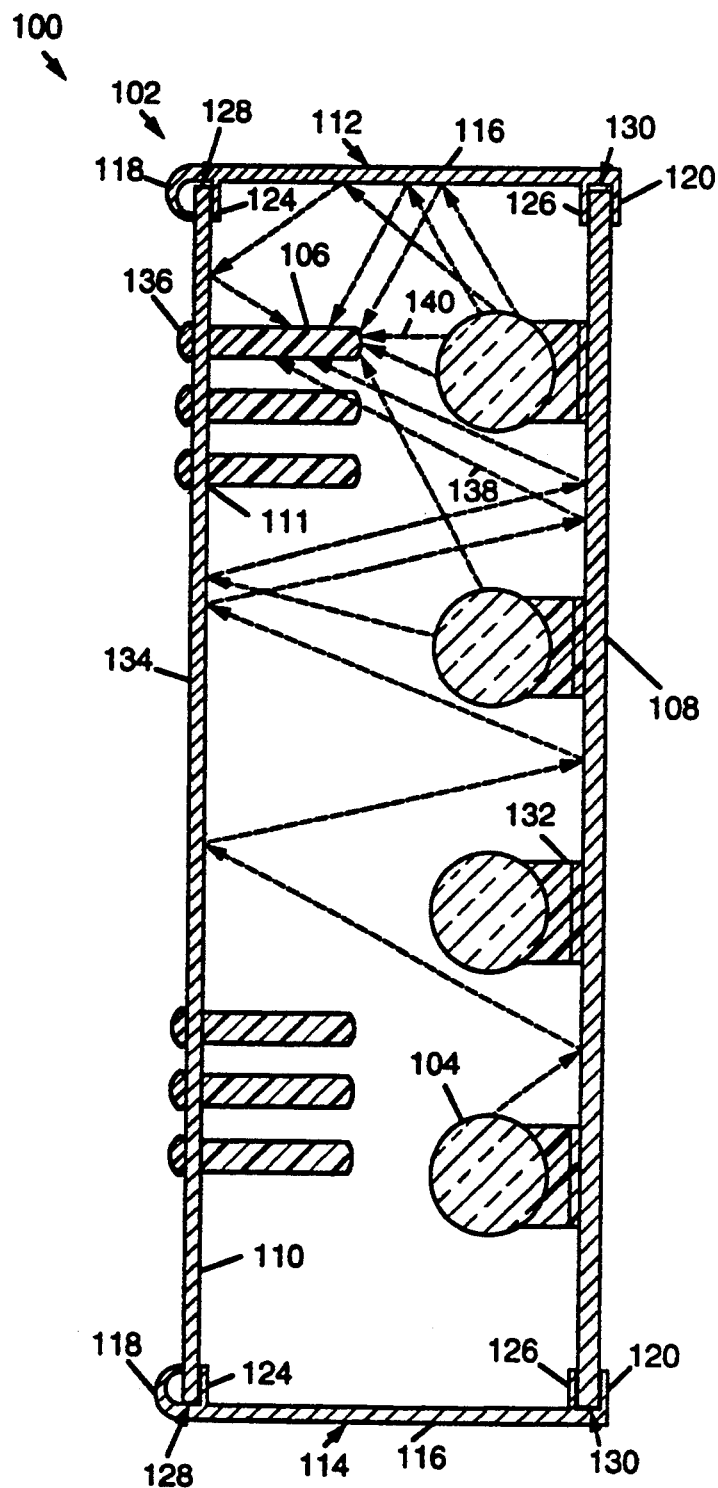
FIG. 1 is an illustrational view of a preferred embodiment of the optical display apparatus in accordance with the present invention.

An optical display apparatus 100 in accordance with the present invention includes an enclosure 102, lighting source 104 and a plurality of optical elements 106, as shown in FIG. 1.

It is envisioned that enclosure 102 may be take any of a number configurations. As shown in the drawings, enclosure 102 is generally rectangular in shape. However, circular, oval or multi-sided configurations may be utilized as desired.

In the preferred embodiment of the present invention, the enclosure 102 includes a rear panel member 108, a front panel member 110 with a plurality of apertures 111, a top section 112 and a bottom section 114. Both top section 112 and bottom section 114 are generally formed with similar cross section and include a generally planar outer wall 116 which is integrated and formed with a pair of outer flanges 118 and 120. The outer flanges 118 are generally inwardly arc in shape and the flanges 120 are generally linear in shape.

The inwardly arc flanges 118 are resilient and are utilized to compress the front panel member 110 against inwardly formed generally linear flanges 124. Linear flanges 124 and 126 are spaced relative to the outer flanges 118 and 120 in order to form elongated channels 128 and 130 in which the edge portions of the panel members 108 and 110 may be selectively and slidingly received.

Within the chamber defined by the enclosure 102, lighting sources 104, typically consisting of fluorescent lamps held in brackets 132 affixed to rear panel member 108, are provided. In accordance with the present invention, the enclosure 102 is formed of a light-reflective and heat-conductive material, for example aluminum. Therefore, light rays from fluorescent lamps 104 are continuously reflected in the chamber defined by enclosure 102, thereby providing high intensive light rays within enclosure 102.

A plurality of light-emitting elements 106, for example optical elements in accordance with the present invention, are extended through the front panel member 110 via its apertures 111. A picture, design or other signs are provided on an outer surface 134 of front panel member 110 having apertures 111. Lights are emitted from the heads 136 of optical elements 106 mounted on the surface 134 through the apertures 111, generating the picture, design or other signs.

The light rays are transmitted to respective optical elements 106 by direct projection from the fluorescent lamps 104 and reflection of chamber. A direct projecting light 140 is from the fluorescent lamps 104 and advances to the optical elements 106. A reflective light 138 is then applied to the optical elements 106 by the reflection in the light-reflective chamber. Thus, the light rays applied to the optical elements 106 are intensive due to the bright fluorescent lamps and the light-reflective chamber defined by the enclosure 102.

Figure 2:
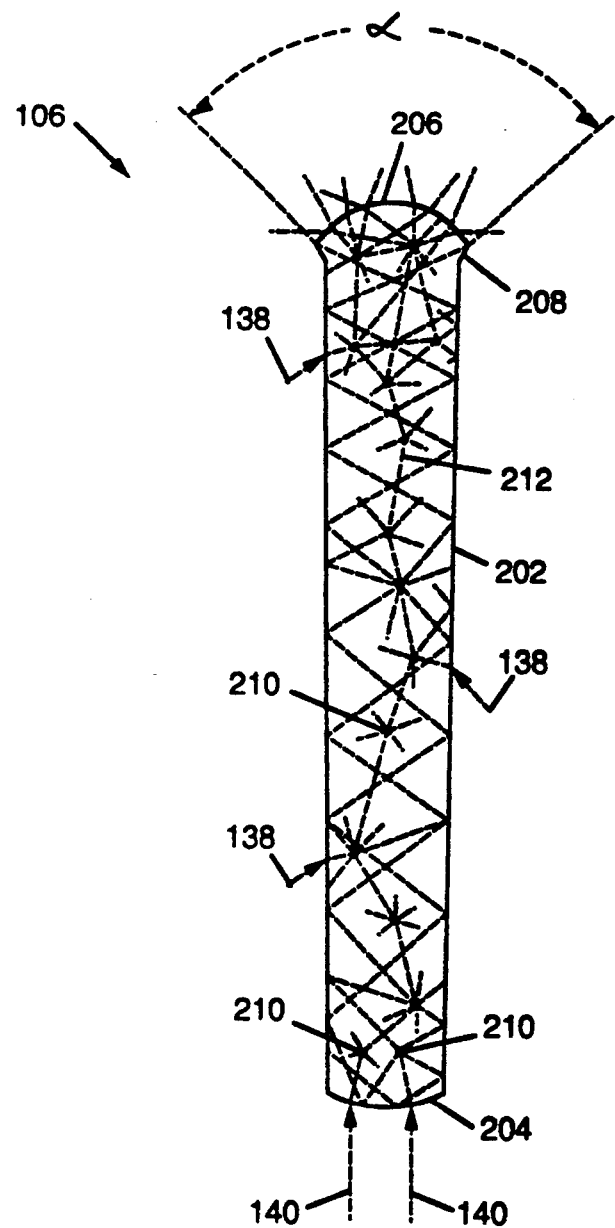
FIG. 2 is an illustrational view of a preferred embodiment of the optical element of the present invention.

The optical element 106 in accordance with the present invention is shown in FIG. 2. The body 202 of optical element 106 is cylindrical in shape for effectively transmission of light rays, the tall end 204 is generally convex to effectively collect light rays, and head 206 is also generally convex to enhance brightness of light. Body 202 extends from the convex tail 204 to a conical portion 208 that extends to convex head 206.

The conical portion 208 defines a light-emitting angle $\alpha$. As required, the light-emitting angle $\alpha$ may be changed to adjust the light emitted from the convex head. In this preferred embodiment, angle $\alpha$ is within 150 degrees to 180 degrees so that most of light in the optical element can be emitted via the head 206. Therefore, an optical element 106 in accordance with the present invention possesses the significant effect of collecting, transmitting and emitting light.

The optical element in accordance with the present invention is made of a mixture of an optical-grade transparent material, preferably acrylic materials, blended with $5 \times 10^{-5}$ to $8 \times 10^{-4}$ of a transparent-colored-fluorescent dye. In view of the property that the colored-fluorescent dye can emit color light under activation of light rays, the optical element in accordance with the present invention possesses an ability to emit light.

In particular, with light rays 140 and 138 entering the optical element through the body 202 and convex tail 204, the fluorescent dye components 210 in the optical element 106 is activated to convert the wavelength of light rays 140 and 138. Along with the light rays from the fluorescent lamps, the activated light 212 transmits forward to the convex head 206 in optical element 106. Thus, the intensity of light rays in the optical element 106 is gradually enhanced as more dye components are activated during the transmission of light in the body 202. It is because of the intensive light rays in the chamber, the good light-collecting property of the optical element, and the light-converting effect of the fluorescent dye components in the optical element 106, the light intensity arriving at convex head 206 is significantly enhanced.

In order to improve light-emitting effect of the convex head 206, a transparent coating of relatively high refractive-index, preferably epoxy, lacquer or glue, is applied onto the surface of convex head 206. According to an optical principle, light rays are refracted from a medium of relatively low refractive-index into another medium of relatively high refractive-index. Therefore, the coating of relatively high refractive-index causes light rays in the convex head 206 to be effectively emitted, which improves the light-emitting property of the optical element 106.

The acrylic material may be blended with $5 \times 10^{-5}$ to $8 \times 10^{-4}$ of bleaching powder to provide uniform light intensity throughout the optical element cross-section. Colored-lacquer may be applied onto the surface of the head of the optical element, so the optical element formed of acrylic material and bleaching powder may also present color light. In accordance with the present invention, such optical elements are used to generate those color lights the optical element containing fluorescent dyes cannot provide.

Figures 3, 5:
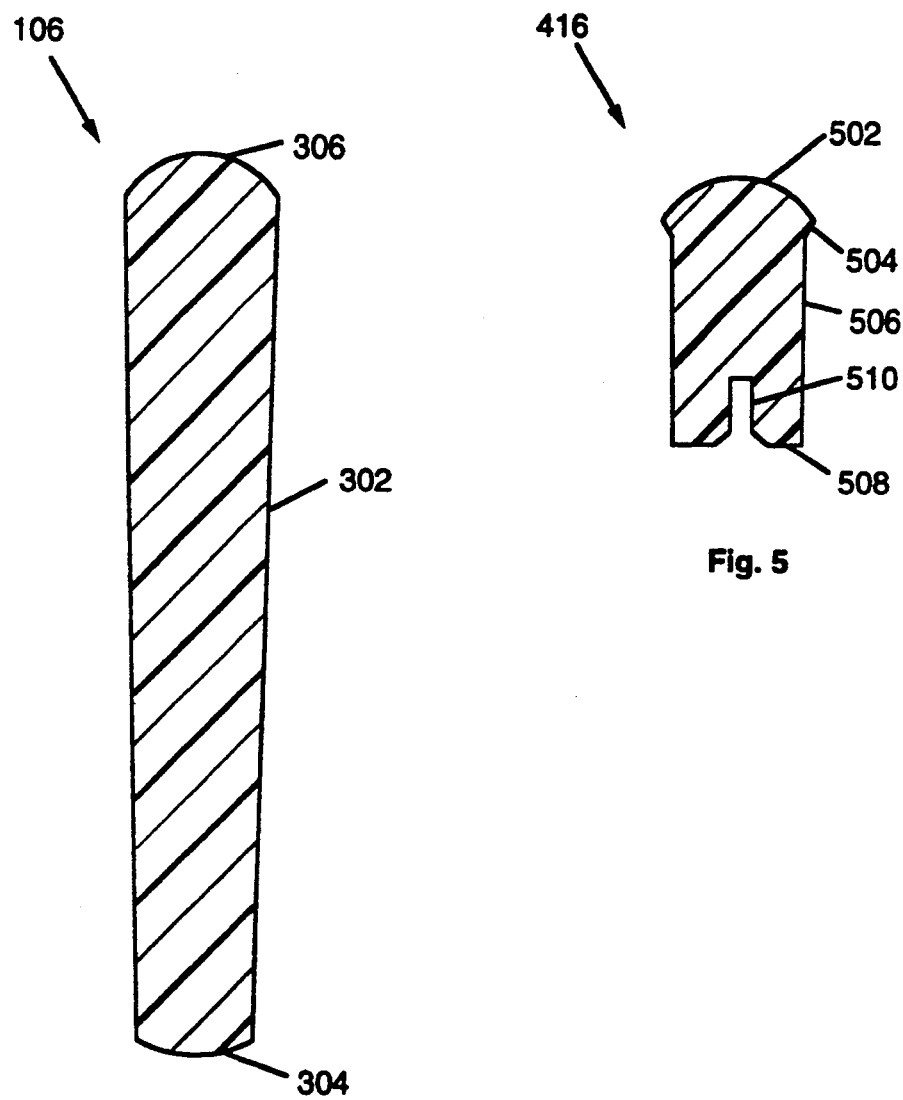
FIG. 3 is an illustrational view of an alternative embodiment of the optical element of FIG. 2.
FIG. 5 is an illustrational view of another preferred embodiment of the optical element of the present invention.

An alternative embodiment of optical element 106 has generally cylindrical body 302 with a convex tail 304 and a convex head 306, as shown in FIG. 3. The diameter of convex head 306 is larger than that of convex tail 304 so that the optical element can be firmly held by the apertures 111 on the panel 134 of enclosure 102. The dimension of the optical element of the present invention may be designed according to requirements of the applications.

Figure 4:
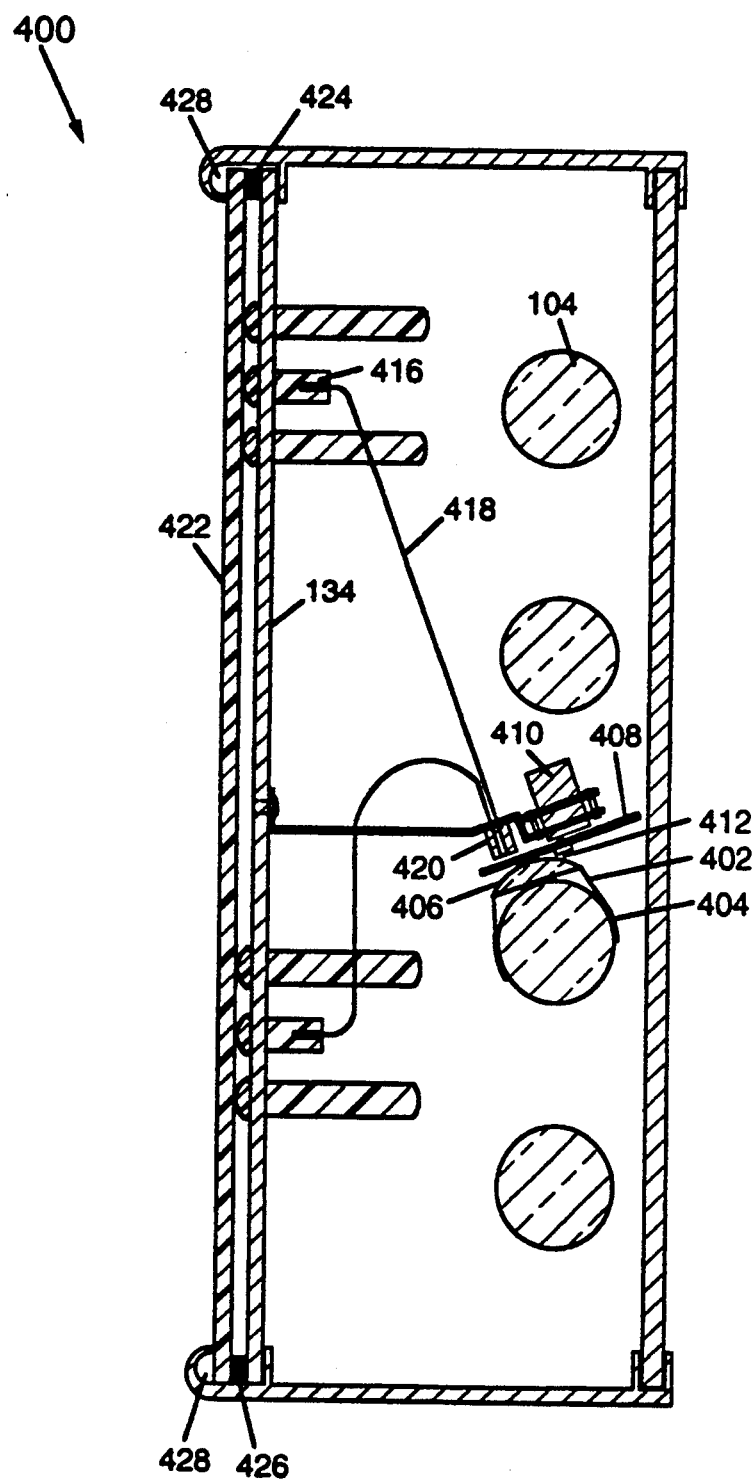
FIG. 4 is another preferred embodiment of the optical display apparatus in accordance with the present invention.

The another embodiment of the present invention further includes a light-collecting assembly 402 having light-reflective members 404 and a convex lens 406, a color disc 408 which bears different color patterns, and an electrical motor 410 for driving the color disc via a shaft 412, as shown in FIG. 4.

A plurality of optical elements 416 are mounted on the panel member 134 in a fashion similar to that shown in FIG. 1. The colored lights from the convex lens 406 is optically coupled to the tail end of each optical element 416 via a fiber 418. The fibers 418 are gathered into a fiber bundle holder 420 which is directly above the color disc 408.

Light-reflective members 404 reflects the light rays from the fluorescent lamp 414 to convex lens 406 where the light rays are focused. With rotation of color disc 408, the lights through rotated color disc 408 becomes variable colors. The lights of variable colors are optically coupled to respective optical elements 416 by fibers 418. Thus, optical elements 416 generate colored lights. Accordingly, with optical elements 106 and 416, the optical-fiber display apparatus of the present invention may provide abundant color display.

To improve the holding of the optical elements mounted on the panel 134, a clear transparent plastic plate 422 is provided so that the heads of optical elements are sandwiched between the plastic plate 422 and the panel member 134. At the top space 424 and bottom space 426 between plastic plate 422 and panel member 134, a filler, for example silicon glue, is filled therein. Therefore, the optical elements, panel member 134 and plastic plate 422 are integrated into a panel assembly that is easily slid in or out of enclosure 102 along channels 428.

The optical element 416 shown in FIG. 4 has a convex head 502, a conical portion 504, a cylindrical body 506 and a tail end 508, as shown in FIG. 5. A dent 510 is at the tail end 508 for receiving the element 418. The optical fiber 416 is formed of the mixture of $5 \times 10^{-5}$ to $8 \times 10^{-4}$ of bleaching powder blended with optical-grade transparent material, for example acrylic material. A transparent coating of relatively high refractive-index is applied on the surface of the convex head 502 onto improve its light-emitting property.

Figure 6:
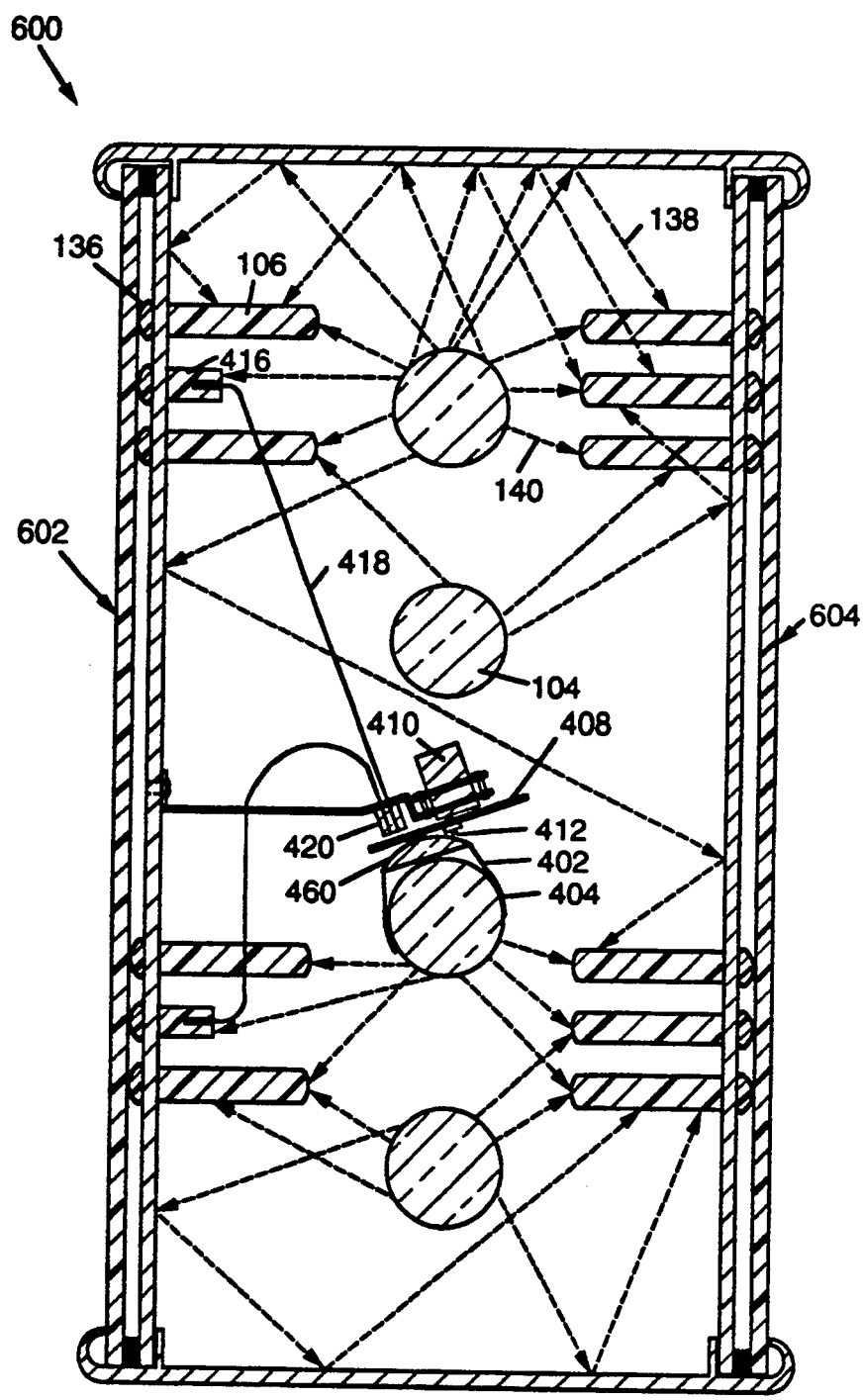
FIG. 6 is an another preferred embodiment of the optical display apparatus in accordance with the present invention.

FIG. 6 shows the other embodiment in accordance with the present invention, which has two panel assemblies 602 and 604, each of them has the same structure as the assembly shown in FIG. 4. Thus, the optical display apparatus may present more information.

Figure 7:
FIG. 7 is a perspective view showing a plate and a panel of the enclosing means, the panel having a plurality of apertures through which the optical elements are inserted.

The panel assembly 602 on which a word "OPEN" is presented is shown in FIG. 7. The panel member 134 has a plurality of apertures 702 of which the word "OPEN" is composed. Because the light emitted by the optical fibers is interactive, the display appears like a continuous sign without discretion. Preferably, the distance between any adjacent apertures is adjusted within 8 mm to provide good resolution. Optical elements 106 are inserted into the apertures 702 with their convex heads on the surface of the panel member 134.

Figure 8:
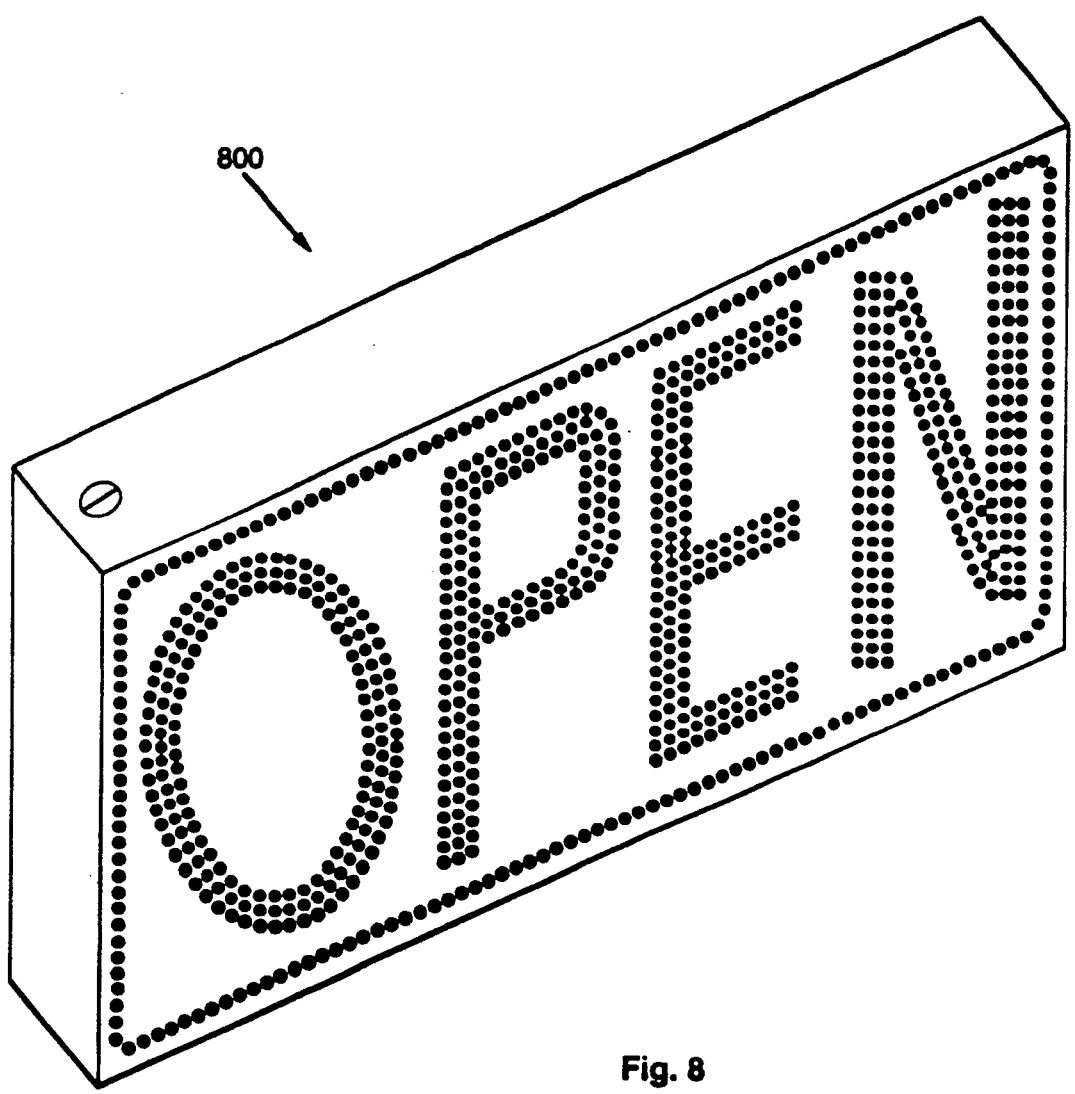
FIG. 8 is a perspective view of the enclosure of optical display apparatus in accordance with the present invention.

Furthermore, the plastic plate 412 is mounted on the convex heads of optical elements 106, thereby firmly holding the optical elements 106 in place. Silicon glue is filled into the space along the edges of the assembly so that the assembly may be easily slid into and removed from the enclosure. Finally, a perspective illustrational view of the optical display apparatus in accordance with the present invention is shown in FIG. 8.

The present invention provides for variations on the above-described construction and arrangements. For example, other assemblies for variable colors can also available to the present invention. The appearance of the enclosure may be changed to meet specified requirements and designs. The material forming the enclosure is not limited aluminum; other materials of light-reflective property are also available. In addition, other compounds of the mixture of optical-grade materials and the additives of light-emitting ability can be used to form the optical elements. The enclosing means can be applied with conventional optical elements and/or color wheel assembly. Likely, the optical elements of the present invention can be applied to conventional frame. The lighting source is also alternated.

It will also be understood that the previous descriptions and explanations are given by way of example, and that numerous changes in the combinations of elements and functions as well as changes in design may be made without departing from the spirit and scope of the invention as hereinafter claimed. These and other modifications to and variations upon the embodiments described above are provided for by the present invention, the scope of which is limited only by the following claims.

What is claimed is:

1. An optical element comprising $5 \times 10^{-5}$ to $8 \times 10^{-4}$ parts by weight of a transparent fluorescent dye per part by weight of a transparent acrylic and at least $5 \times 10^{-5}$ parts by weight of a bleaching powder per part by weight of said transparent acrylic.

2. An optical element as recited in claim 1 wherein said optical element has a substantially cylindrical body, a first convex end, and a second convex end, said body extending from said second convex end to said first convex end, said first convex end and said second convex end sharing a common axis of cylindrical symmetry, said first convex end being larger than said second convex in diameter.

3. An optical element as recited in claim 2 wherein a transparent color lacquer is applied onto said first convex end.

4. An optical element as recited in claim 2 wherein a transparent coating of a relative high refractive-index is applied onto said first convex end.

5. An optical element as recited in claim 2 further comprising a conical neck portion extending from a portion of said body to said first convex end.

6. An optical display apparatus comprising:

enclosing means for confining a light reflective chamber, said enclosing means having a panel having a plurality of apertures, said panel having an outside surface;

lighting means mounted within said enclosing means for generating light rays, said light rays being reflected within said enclosing means; and a plurality of optical elements including $5 \times 10^{-5}$ to $8 \times 10^{-4}$ parts by weight of a transparent fluorescent dye per part by weight of a transparent acrylic and a bleaching powder, each of said plurality optical elements having a substantially cylindrical body, a first convex end, and a second convex end, said optical elements being mounted through said panel via said a plurality of apertures so that each said first convex end is on the outside surface of said panel while each said second convex end and each said body are exposed within said chamber.

7. An optical display apparatus as recited in claim 6 wherein said plurality optical elements comprises at least $5 \times 10^{-5}$ parts by weight of said bleaching powder per part by weight of said transparent acrylic.

8. An optical display apparatus comprising:

enclosing means for confining a light reflective chamber, said enclosing means having at least one first transparent member and one first panel having a plurality of first apertures, said first transparent member and said first panel forming a first panel assembly that defines a first space between said first transparent member and said first panel;

lighting means mounted within said enclosing means for generating light rays, said light rays being reflected within said enclosing means; and a plurality of optical elements, each of said optical elements having a substantially cylindrical body, a first convex end, and a second convex end, said first convex end being larger than said second convex in diameter, said each of optical elements being mounted through said first panel via each of said plurality of first apertures so that said first convex end is sandwiched within said first space while said second convex end and said body are exposed within said chamber.

9. An optical display apparatus as recited in claim 8 wherein said optical elements include a bleaching powder and a transparent acrylic.

10. An optical display apparatus as recited in claim 9 wherein said optical elements include at least $5 \times 10^{-5}$ parts by weight of said bleaching powder per part by weight of said transparent acrylic.

11. An optical display apparatus as recited in claim 9 comprising $5 \times 10^{-5}$ to $8 \times 10^{-4}$ parts by weight of a transparent fluorescent dye per part by weight of said transparent acrylic.

12. An optical display apparatus as recited in claim 9 wherein a transparent color lacquer is applied onto said first convex end.

13. An optical display apparatus as recited in claim 9 wherein a transparent coating of a relative high refractive-index is applied onto said first convex end.

14. An optical display apparatus as recited in claim 8 wherein said lighting means includes fluorescent lighting means.

15. An optical display apparatus as recited in claim 8 further comprising a second transparent member and a second panel having a plurality of second apertures, said second transparent member and said second panel forming a second panel assembly that defines a second space between said second transparent member and said second panel, said optical elements being mounted through said second panel via said plurality of second apertures so that said first convex end is sandwiched within said second space while said second convex end and said body are within said chamber.

16. An optical display apparatus as recited in claim 9 wherein a gap between adjacent optical elements is at most 8 mm.

* * * * *